United States Patent Office 3,454,880
Patented July 8, 1969

3,454,880
PLURAL SERVO MEASURING DEVICE INCLUDING "ZERO" AND "RANGE" CALIBRATION
Ludwig Ries, Konigshofen, near Niedernhausen, Fritz Schreiner, Frankfurt am Main, and Werner Schaefer, Kelkheim, Taunus, Germany, assignors to Hartmann & Braun Aktiengesellschaft, Frankfurt am Main, Germany, a corporation of Germany
Filed Mar. 16, 1967, Ser. No. 623,579
Claims priority, application Germany, Apr. 9, 1966, H 59,082
Int. Cl. G01r 1/02
U.S. Cl. 324—130        7 Claims

ABSTRACT OF THE DISCLOSURE

A transformation system for periodic compensation of inaccuracy arising from sensor instability. Output of the system is inherently accurately dependent, through a servo potentiometer 23, 11, on voltage values across the output load resistor 12 of negative feedback amplifier receiving sensor signal as input, except during interruption for standardization of such voltage values with sensor on reference samples; in latter case servo 23 is dead and system output remains at the amount occurring just prior to interruption. Bringing such voltage to two standard values, e.g. for meter scale ends, is automatically accomplished during interruption by respective change in bias (by 15) on sensor output e.g. for zeroizing, and change in proportion of feedback (at 21) e.g. for full scale, when low and high reference samples are respectively sensed.

---

Figure 1:
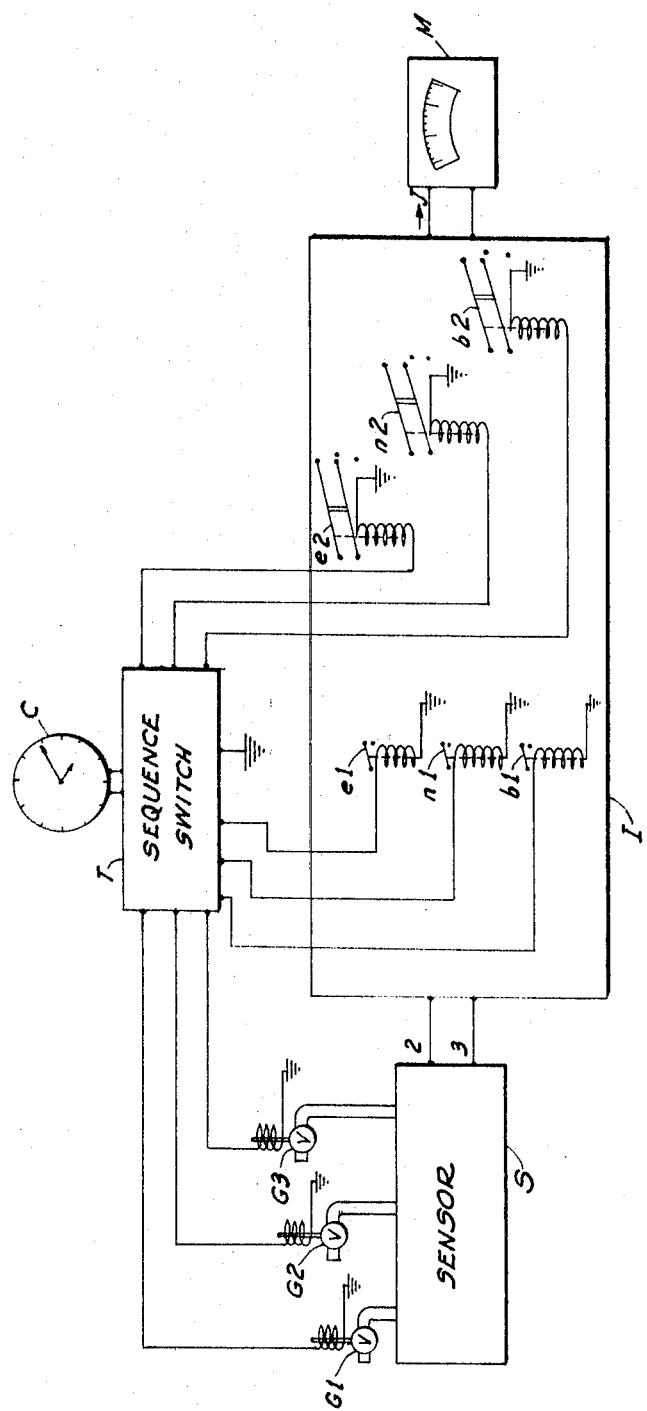

This invention relates to an electrical instrument transformation system which includes automatic calibration facilities.

In the development of instrumentation for measurement and control, steps designed to improve the accuracy and stability of the measuring system and to ensure the generation of a uniform output signal are matters of the utmost importance. Frequently it is desirable that the output signal should be an electric current which will always attain the same value, say 20 ma., at the end of the measuring range (impressed current). This "standardization" of the output signal clearly provides substantial advantages when such arrangements are to be used in conjunction or combination with control or data processing systems.

The transformation of the input signal into an impressed current of high precision and zero point stability can be achieved by instrument transformers employing electronic means.

However, the expense of providing such systems would not be worth while if the zero point stability and sensitivity of the measuring sensor were itself not sufficiently high. In this respect many types of sensors, for instance in analysers, lack required stability. Uncertainty factors may be inherent in their particular form of construction or they may be sensitive to environmental conditions. Primarily such instabilities have the form of zero point creep and slow changes in sensitivity. The reproducibility of the signals obtained from such sensors must therefore be improved by recalibrating them from time to time. In order to relieve the operating personnel from the tiresome and time-consuming duty, automatic testing and calibrating devices have already been proposed, for instance, for gas analysers. These devices are adapted at preselectable intervals of time, either under the control of a programming switch or by manually initiated response, automatically to test and recalibrate as described in United States Patent No. 2,939,953.

Devices known to the art associated with the gas analysing instruments operate by feeding into the analyser two different reference gases, preferably corresponding to the beginning and end of the intended measuring range, these gases generating voltages which mark the ends of the measuring range. By regulating means which operate auxiliary setting members inside or outside the analyser the output signals delivered by the analyser (measured values) in respect of these reference gases are adjusted to the corresponding required voltages. When the calibration process has been completed normal operation is resumed. The calibrating means simultaneously perform some of the functions of a separate instrument transformation system associated with the analyser.

Calibrating instruments in the form of units that are completely separate from the analyser and that are manually adjustable are also known for resetting the beginning and end of the measuring range of a gas analyser. It would not be difficult to automate such instruments by means that are known in the art.

However, all these calibrating devices have the drawback that adjustment of one of the calibrated settings, usually marking the beginning and end of the scale, affects the adjustment of the other, unless further corrections are made in the analyser itself, and that during the process of calibration the normal measuring signal, such as a meter reading or output to a control device, disappears. These drawbacks are overcome by the present invention which seeks to improve electrical instrument transformation systems comprising automatic calibration facilities wherein the signals generated in an associated measuring device, when measuring preselected reference quantities (calibration signals), are compared with corresponding preset constant electrical reference signals provided in the transformation system, and wherein difference signals derived from said comparison control adjusting means which correspondingly adjust the transformation characteristics of the system.

Accordingly the present invention provides an instrument transformation system of the specified kind which comprises an adjustably variable negative feedback input amplifier to which is applied the difference between the input signal from the measuring device and an adjustably variable electrical compensating signal. A first three-position switch operates to apply consecutively the differences between two preset electrical reference signals and a quantity derived from the output of the transformation system on the one hand, and the output signal from the input amplifier on the other hand, to a controller. The controller, according to the position of said first three-position switch, activates one of three servo motors through a second synchronously operated three-position switch. The first two motors operate to adjust said compensating signal and the proportion of negative feedback in the input amplifier respectively, whereas the third motor operates to adjust the independently generated electrical output signal of the transformation system. Gates are associated with said three-position switches to introduce to the measuring device either the preselected reference quantities or the quantities that are to be measured, according to the position of said switches.

In a preferred embodiment of the invention the controller may be a step controller of which the output contacts respond, when the input difference signal deviates in the positive or negative direction from zero, to start in the corresponding direction of rotation a servo motor connected to the controller by said second three-position switch.

Conveniently the compensating signal which is applied in opposition to the signal from the measuring device to the input of the input amplifier is a fractional voltage adjustable by one of the servo motors and tapped from a resistance network fed by a constant voltage source. The same network may be used to provide the present electrical reference signals required for calibration in the form of preselectable fixed voltages.

The current source for the system output may with advantage be a negative feedback impressed current output amplifier controlled by an adjustable input bridge circuit fed by a constant voltage source.

Furthermore, according to another preferred feature of the invention the three-position switches which operate in synchronism with the gates controlling the introduction of the measured and preselected reference quantities to the measuring device are operable optionally either manually or automatically by sequence switch means which also control the gates.

The sequence switch means may be operated at selectable intervals under the control of a timing clock.

For a better understanding of the nature of the invention an embodiment thereof will be hereinafter more particularly described by reference to the accompanying drawing. It is understood that this embodiment is not intended to limit the scope of the invention defined in the claims.

Figure 2:
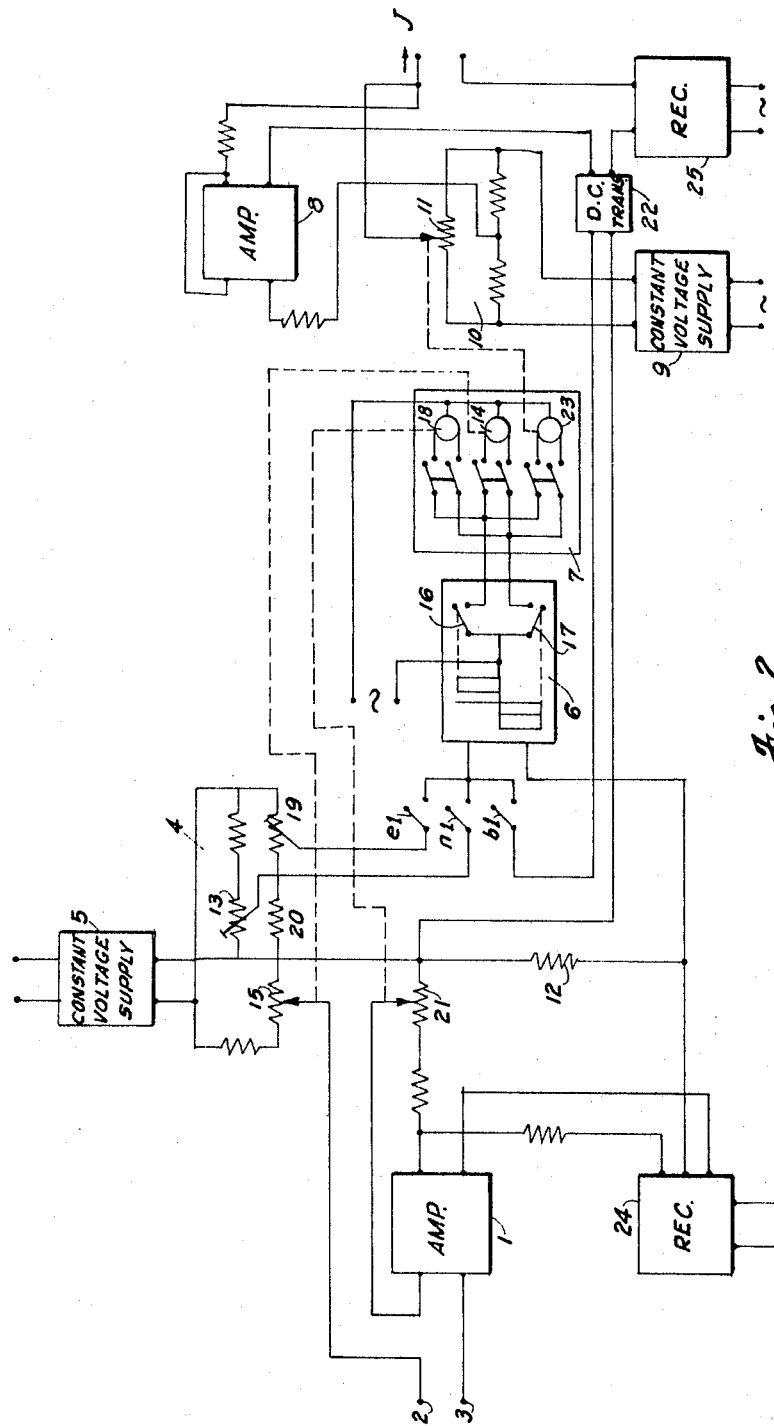

FIG. 1 schematically shows the transformation system, with only a few of its parts in detail, interposed between a sensor and a current meter, and FIG. 2 shows the circuitry of the system.

The instrument transformation system I is shown in FIG. 1 interposed between a sensor S and control device such as a meter M. Among the components of the system are switches $e_1$ and $e_2$; $n_1$ and $n_2$; $b_1$ and $b_2$ making up a three-position switch whose function will be described in connection with FIG. 2. The operation of the switches is controlled by a clock C and sequence switch means T which also controls the passage of two reference or standard samples of say gas via gates e.g. valves $G_2$ and $G_3$ and an analysis sample via a similar gate $G_1$, to the sensor, such as a gas analyser. In practice, the tion as to correspond to the beginning and end of the range of the gas analyser. The gas analyser itself might be a thermal conductivity analyser or it might be of the infrared absorption type. The sequence switch means may comprise motor-driven cam means which operate contacts in the manner and sequence required. The contacts may be arranged to open and close circuits containing relays for operating the magnetic valves and the three-position switches.

The instrument transformation system as shown in FIG. 2 is connected to the output termnials 2 and 3 of the gas analyser. The input of the transformation system is contituted by a negative feedback amplifier 1. An adjustably variable voltage tapped from a potentiometer 15 in a network 4 (compensating voltage) is counter-connected to the input signal voltage of the amplifier. Moreover, the proportion of the amplifier output feedback to the input is controllable by a potentiometer 21. The network 4 is fed by a constant voltage supply 5 and also provides two reference voltages for calibration. These can be tapped from preset potentiometers 13 and 19. These reference voltages can be applied in opposition to the output voltage developed across the load resistor 12 of the input amplifier to a controller 6. They are equal to the voltages required to appear across the load resistor of the input amplifier when the analyser is fed with the two calibrating reference gases which in principle may be chosen to provide signals anywhere within the measuring range, though preferably they should mark the beginning (not necessarily zero) and the end of the range. The resultant difference voltages are applied by the three-position switch $e_1$, $n_1$, $b_1$ to a step controller 6 which by operation of contacts 16 and 17 in conventional manner controls the direction of rotation of controlled servo motors, 18, 14 or 23. As indicated in the drawings those servo motors adjust the sliders of the above mentioned potentiometers 15 and 21 as well as the slider of a potentiometer 11 which forms part of a bridge circuit 10 in the input of a negative feedback amplifier 8 which generates the output signal of the instrument transformation system. In conjunction with the bridge, which is fed by a constant voltage source 9, the amplifier 8 generates a current J in the output of the transformation system which is proportional to the input. In order to achieve this result a suitable feedback must be provided between the output of the transformation system and the input amplifier. This is established by a circuit separating element 22 which derives a voltage from the output of the transformation system and applies it in opposition to the output voltage of the input amplifier across the load resistor 12. The difference voltage is applied to the step controller which by starting the servo motor 23 shifts the slider of the potentiometer 11 in the input bridge of the output amplifier 8. The circuit separating element 22 may function in the manner of a direct current transformer or converter comprising a chopper, A.C. transformer and rectifier. The supply voltages for the two amplifiers 1 and 8 are obtained from mains rectifiers 24 and 25.

When the sequence switch has been started by the timing clock the calibrating operation proceeds as follows: By actuating magnetically operable valves $G_1$, $G_2$ and $G_3$ the sequence switch T first closes the supply valve $G_1$ for admitting the gas being analysed into the analyser and, opens $G_2$ to admit the reference gas which corresponds to the beginning of the measuring range. At the same time the two switches $b_1$ and $b_2$ which had been closed are opened and the switches $n_1$ and $n_2$ are closed. A voltage is therefore now applied to the step controller which represents the difference between the voltages across the load resistor 12 of the input amplifier 1 and the preset reference voltage derived from the potentiometer 13. This preset reference voltage to which the potentiometer 13 has been adjusted is the voltage that should appear across the load resistor 12 when the signal from the analyser is that corresponding to the beginning of the measuring range. If the actual voltage across the load resistor 12 differs from the reference voltage, i.e. if the input voltage applied to the step controller is not zero, the controller will in conventional manner start up the servo motor 14 to shift the slider of potentiometer 15 until the compensating voltage in the input of the amplifier 1 has reduced the voltage applied to the controller to zero. This will be the case when the required voltage agrees with the reference voltage. This completes the first stage in the calibration of the instrument transformation system, and compensates any change that may have occurred in the signal voltage delivered by the analyser at the beginning of the measuring range, i.e. any change in the zero point of the scale of meter M.

Assuming that the measuring range of the analyser begins at zero, its output voltage must generally be slightly raised in order to associate at least a small signal voltage with a zero value measurement. This signal voltage should be sufficient to ensure that even the largest zero point deviations will not cause the polarity of the output signal to be reversed. If this is assured any zero point deviation can always be compensated by a voltage of unchanging polarity.

The calibration process for resetting the end of the measuring range of the analyser proceeds analogously to that described. The sequence switch first appropriately changes over the positions of the magnetic valves $G_2$ and $G_3$ to admit the appropriate reference gas to the analyser and, whilst opening the switch $n_1$ it closes the switch $e_1$. Moreover, the servo motor 14 is disconnected from the controller and in its stead the servo motor 18 is connected up by the closure of contact $e_2$. The reference voltage which corresponds to the end of the measuring range, and which is tapped from the potentiometer 19 and its series resistor 20 is thus now opposed to the voltage across the load resistor 12 of the input amplifier 1, the difference between the two voltages appearing across the input terminals of the step controller. The difference is zeroised by the servo motor 18 shifting the slider of the potentiometer 21 which controls the feedback of the input amplifier 1.

As soon as the automatic process of balancing has been effected the servo motor 18 stops and the second stage of the calibration procedure for resetting the voltage at the end of the analyser measuring range is completed, any change in measuring sensitivity being compensated. Since the two calibrating steps are completely independent a further check of the zero adjustment is not required.

The sequence switch then operates to restore the admission via valve $G_1$ the gas to be analysed into the analyser and contact $b_1$ of the group of contacts $e_1$, $n_1$, $b_1$ is reclosed. This further switching operation results in a voltage component derived from the output of the amplifier 8 being transmitted through the circuit separating element 22 and compared with the voltage across the load resistor 12 of the input amplifier 1. The servo motor 23 which is reconnected by contact $b_2$ to the step controller then operates automatically to adjust the potentiometer 11 in the resistance bridge circuit 10 which is fed by a constant voltage source 9 and which is located in the input of the output amplifier 8. The servo motor stops when the two voltages are equal. The current J in the output of the amplifier 8, which is the output quantity of the instrument transformation system I, is thus always proportional to the output of the input amplifier 1 and therefore reflects the value measured by the gas analyser, such as the percentage content of a particular component in a measured gas. Since the current is an impressed current, any kind of instruments for indicating, recording or regulating the analysed quantity can be included in series in the output circuit of the transformation system.

Whenever a fresh calibration cycle is initiated by the time clock the output current corresponding to the last measured value persists during the calibration process. This advantageous memory feature of the transformation system facilitates comparisons between the measured results before and after calibration and avoids the otherwise necessary disconnection of the instrumentation connected to the system output, a feature which is of particular utility when the system is used for purposes of control.

It is to be understood that the timing of the sequence switch is such that the sensor actually senses the appropriate composition at the proper time. For instance, if the sensor is a gas analyser of appreciable volume, closure of switches $b_1$ and $b_2$ immediately after standardisation for full scale could cause an output greater than that corresponding to the composition of analysis gas simply due to the fact that gas composition in the analyser had not attained equilibrium with that being admitted. Delay in closing switch $b_2$ to allow attainment of equilibrium will largely remove the source of error.

On the other hand, a certain amount of sluggishness of the sensor or mixing of references and analysis gas may be of benefit. For instance if there are circumstances where zero output of the sensor might present a problem quick change over from analysing operation to standardisation for zero point before equilibrium could be used to approach zero asymptotically.

Those skilled in the art will be able to determine proper timing of the sequence switch under the specific requirements so that standardisation is completed and interruption time will not normally extend beyond the period safe for the system to continue delivering its memorized output.

The invention claimed is:

1. An electrical instrument transformation system which includes automatic calibration facilities whereby the signals generated by a measuring device associated with said system, when said measuring device measures preselected reference quantities marking fixed points in the measuring range are compared with preset electrical reference signals generated in said transformation system, and whereby difference voltages derived from said comparison control adjusting means which correspondingly adjust the transformation characteristics of said system, said system comprising a negative feedback input amplifier to which the output signals from said measuring device are applied, adjustable means for applying to said input amplifier a compensating signal in opposition to said output signal from said measuring device, means for varying the proportion of negative feedback in said input amplifier, means for generating preset electrical reference signals, three servo motors, a controller associated with a three-position switch means in its output for selectably operating the three servo motors, the first motor adjusting said means for applying said compensating signal to said input amplifier, the second motor driving said means for varying the proportion of negative feedback in said input amplifier, separate means for independently generating output from the system, adjustable means driven by the third motor for controlling the magnitude of said independently generated output of the system, and a three-position switch in the input of said controller for selectively applying to said controller the difference signals between the output signal from said input amplifier and said preset reference signals for the purpose of calibration and between said output signal from said input amplifier and a signal derived from the output of said transformation system for the purpose of measurement.

2. An instrument transformation system as defined in claim 1, wherein said controller is a step controller of which the output contacts start one of said servo motors in the appropriate direction of rotation when the difference signal applied to said step controller by said three-position switch in the controller input deviates from zero in the positive or negative direction.

3. An instrument transformation system as defined in claim 1, wherein said compensating signal applied to said input amplifier is a fractional voltage tapped by an adjustable potentiometer controlled by one of said servo motors and comprised in a resistance network, and a constant voltage source feeding the network.

4. An instrument transformation system as defined in claim 3, wherein said resistance network further comprises preset potentiometers for supplying said preset reference signals.

5. An instrument transformation system as defined in claim 1, wherein said independently generated output signal of said transformation system is generated by a negative feedback impressed current output amplifier controlled by an input bridge circuit fed by a constant voltage source and containing an adjustable member, and said third servo motor controls the position of said adjustable member.

6. An instrument transformation system as defined in claim 1, comprising sequence switch means for controlling the positions of said three-position switch means in synchronism with the admission of said preselected reference quantities and of the measured quantity to said measuring device.

7. An instrument transformation system as defined in claim 6, wherein said sequence switch means are controlled by a timing device.

References Cited

UNITED STATES PATENTS 3,281,685 10/1966 Talbot.
3,348,046 10/1967 Lloyd.

ORIS L. RADER, *Primary Examiner.*

THOMAS E. LYNCH, *Assistant Examiner.*

U.S. Cl. X.R.

250—43.5; 318—18, 29; 324—99, 115